(12) United States Patent
Huang (10) Patent No.: US 8,451,514 B2
(45) Date of Patent: May 28, 2013

(54) MULTIFUNCTION PERIPHERAL AND POSITION-CALIBRATING METHOD OF SCANNING MODULE

(75) Inventor: Cheng-Yu Huang, Taoyuan Hsien (TW)

(73) Assignee: Teco Image System Co., Ltd., Taoyuan Hsien (TW)

( * ) Notice: Subject to any disclaimer, the term of this patent is extended or adjusted under 35 U.S.C. 154(b) by 344 days.

(21) Appl. No.: 12/911,535

(22) Filed: Oct. 25, 2010

(65) Prior Publication Data

US 2012/0033268 A1 Feb. 9, 2012

(30) Foreign Application Priority Data

Aug. 4, 2010 (TW) ................................. 99125917 A (51) Int. Cl.
*H04N 1/04* (2006.01)
(52) U.S. Cl.
USPC ............ 358/488; 358/486; 358/497; 358/474
(58) Field of Classification Search
USPC .................. 358/488, 486, 497, 474, 494, 482
See application file for complete search history.

(56) References Cited

U.S. PATENT DOCUMENTS 6,381,043 B1 * 4/2002 Tsai et al. ..................... 358/488
2008/0291508 A1 * 11/2008 Huang et al. .................. 358/474

* cited by examiner

*Primary Examiner* — Houshang Safaipour (57) ABSTRACT

A multifunction peripheral includes a scanning platform, a scanning module, a recording unit and a controlling unit. The scanning platform includes a standby position, a position-calibrating structure and a datum line. The scanning platform is divided into a first zone and a second zone by the datum line. The position-calibrating structure is included in the second zone. The scanning module is movable with respect to the scanning platform for performing a scanning operation. The recording unit is used for recording a parameter associated with a position of the scanning module with respect to the scanning platform. The controlling unit is used for controlling movement of the scanning module according to the parameter recorded in the recording unit, so that the scanning module is moved through the position-calibrating structure to perform a position-calibrating operation. After the position-calibrating operation is completed, the scanning module is moved to the standby position.

14 Claims, 7 Drawing Sheets

MULTIFUNCTION PERIPHERAL AND POSITION-CALIBRATING METHOD OF SCANNING MODULE

CLAIM OF PRIORITY

This application claims priority to Taiwanese Patent Application No. 099125917 filed on Aug. 4, 2010.

FIELD OF THE INVENTION

The present invention relates to a position-calibrating method of a scanning module, and more particularly to a position-calibrating method of a scanning module for reducing abrasion and noise. The present invention also relates to a multifunction peripheral using such a position-calibrating method.

BACKGROUND OF THE INVENTION

Nowadays, scanning apparatuses such as multifunction peripherals become essential electronic devices in the office or home. The multifunction peripheral has a scanning module for scanning images of documents, photographs or films. Generally, after a multifunction peripheral is turned on, a position-calibrating operation is performed to calibrate the standby position of the scanning range of the scanning module.

Figure 1A:
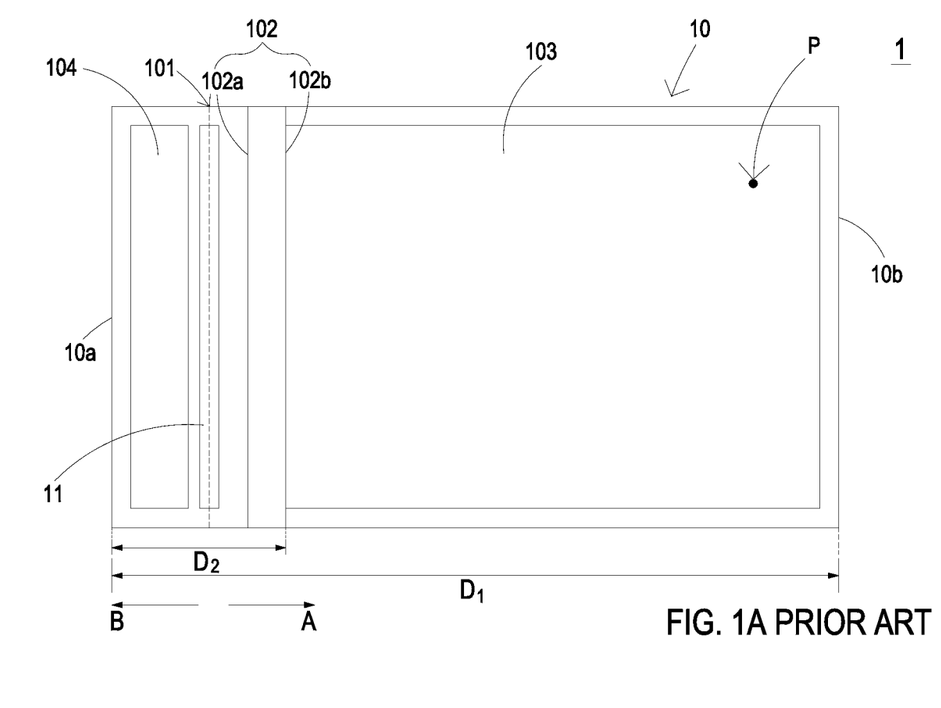
FIG. 1A is a schematic view illustrating a multifunction peripheral with a position-calibrating structure according to the prior art.
Figure 1B:
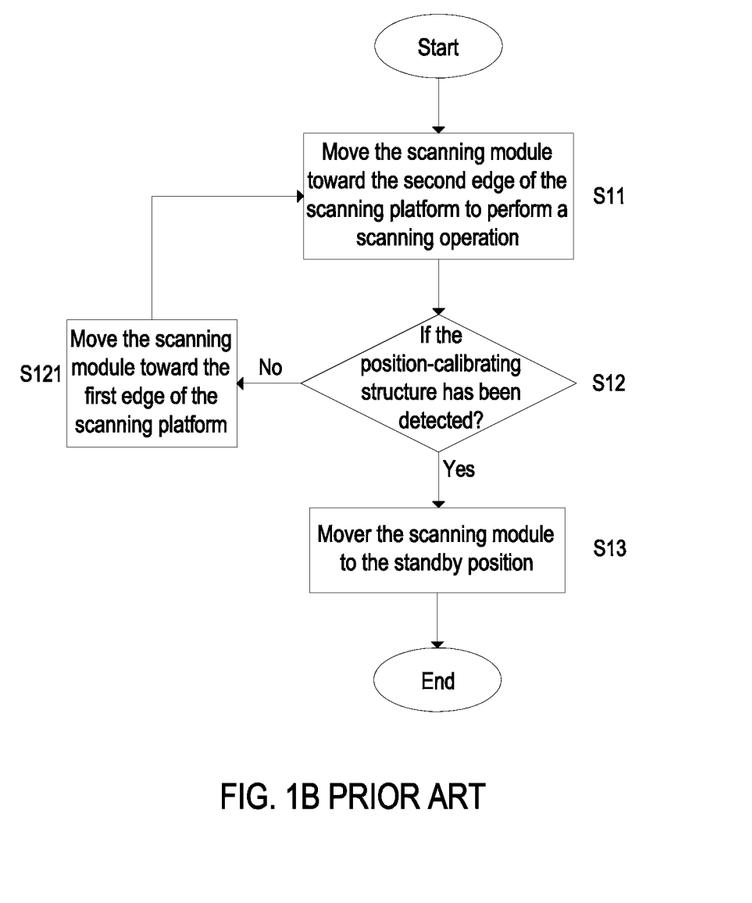
FIG. 1B is a flowchart illustrating a method for performing a position-calibrating operation of the scanning module of the multifunction peripheral of FIG. 1A.

FIG. 1A is a schematic view illustrating a multifunction peripheral with a position-calibrating structure according to the prior art. FIG. 1B is a flowchart illustrating a method for performing a position-calibrating operation of the scanning module of the multifunction peripheral of FIG. 1A.

As shown in FIG. 1A, the conventional multifunction peripheral 1 comprises a scanning platform 10 and a scanning module 11. The scanning platform 10 has a first edge 10a and a second edge 10b, which are opposed to each other and separated from each other by a first distance D1. From the first edge 10a to the second edge 10b, the scanning platform 10 further comprises a standby position 101, a position-calibrating structure 102, a first scanning window 103 and a second scanning window 104. The position-calibrating structure 102 comprises a first rim 102a and a second rim 102b. The second rim 102b of the position-calibrating structure 102 is arranged beside the first scanning window 103. The first rim 102a of the position-calibrating structure 102 is closer to the standby position 101 than the second rim 102b. Moreover, the second rim 102b of the position-calibrating structure 102 is separated from the first edge 10a by a second distance D2. The scanning module 11 is disposed under the scanning platform 10. The scanning module 11 is driven by a motor (not shown) to be moved between the first edge 10a and the second edge 10b.

Please refer to FIGS. 1A and 1B. Normally, after the scanning operation of the scanning module 11 is completed, the scanning module 11 is stayed at the standby position 101. After the multifunction peripheral 1 is re-started, the scanning module 11 may be moved toward the second edge 10b of the scanning platform 10 (i.e. in a first direction A) for at least a first displacement. The first displacement is substantially equal to the second distance D2. Moreover, during the scanning module 11 is moved in the first direction A, the scanning module 11 performs a scanning operation (Step S11). Then, the step S12 is performed to judge whether the position-calibrating structure 102 has been detected. If the position-calibrating structure 102 has been detected, the scanning module 11 is returned to the standby position 101 (Step S13). Meanwhile, the position-calibrating operation is completed.

On the other hand, if the position-calibrating structure 102 is not detected in the step S12, the scanning module 11 is reversely moved toward the first edge 10a of the scanning platform 10 (i.e. in a second direction B) for a second displacement to assure that the scanning module 11 is returned to the left side of the position-calibrating structure 102 (Step S121). The second displacement is substantially equal to the first distance D1. Then, the step S11 is performed to move the scanning module 11 in the first direction A for approximately the second distance D2, so that the position-calibrating operation of the scanning module 11 is completed.

However, if the electricity provided to the multifunction peripheral 1 is interrupted (e.g. the utility power is interrupted or the power switch is erroneously turned off), the scanning module 11 fails to be returned to the standby position. If the scanning module 11 is stayed at the position P that is separated from the second edge 10b by a distance shorter than the second distance D2, after the multifunction peripheral 1 is re-started and the step S11 is performed, the scanning module 11 needs to be moved in the first direction A for the first displacement, which is about equal to the second direction. Under this circumstance, the scanning module 11 may hit the second edge 10b. Even if the position P is separated from the second edge 10b by a distance longer than the second distance D2, the scanning module 11 needs to be moved in the second direction B for the second displacement that is substantially equal to the first distance D1 (in the step S121). Under this circumstance, the scanning module 11 may hit the first edge 10a.

Moreover, when the scanning module 11 is moved to the first edge 10a or the second edge 10b, the scanning module 11 fails to be advanced, but the motor continuously runs. Under this circumstance, the gear set of the motor is abraded, and thus the use life of the multifunction peripheral is shortened. In addition, the noise generated from the abrasion of the motor is uncomfortable. Moreover, even if the scanning module 11 is stayed at the first scanning window 103 and close to the position-calibrating structure 102, the steps depicted in the flowchart of FIG. 1B should be done to implement the position-calibrating operation. That is, in addition to the problems of causing noise, abrasion of the motor gear and idle running of the motor, it is also time-consuming to implement the position-calibrating operation.

Therefore, there is a need of providing a multifunction peripheral and a position-calibrating method of a scanning module so as to obviate the drawbacks encountered from the prior art.

SUMMARY OF THE INVENTION

The present invention provides a multifunction peripheral and a position-calibrating method of a scanning module of the multifunction peripheral in order to avoid the problems of causing noise, abrasion of the motor gear and idle running of the motor, and reduce the time period to implement the position-calibrating operation.

In accordance with an aspect of the present invention, there is provided a multifunction peripheral. The multifunction peripheral includes a scanning platform, a scanning module, a recording unit and a controlling unit. The scanning platform includes a standby position, a position-calibrating structure and a datum line. The scanning platform is divided into a first zone and a second zone by the datum line. The position-calibrating structure is included in the second zone. The scanning module is movable with respect to the scanning platform for performing a scanning operation. The recording unit is used for recording a parameter associated with a position of the scanning module with respect to the scanning platform. The controlling unit is used for controlling movement of the scanning module according to the parameter recorded in the recording unit, so that the scanning module is moved through the position-calibrating structure to perform a position-calibrating operation. After the position-calibrating operation is completed, the scanning module is moved to the standby position.

In accordance with another aspect of the present invention, there is provided a position-calibrating method of a scanning module of a multifunction peripheral. The position-calibrating method includes steps of: (a) monitoring movement of the scanning module; (b) detecting a position of the scanning module; (c) recording the parameter associated with the position of the scanning module, wherein the parameter is either a first value to indicate that the position of the scanning module lies in the first zone or a second value to indicate that the position of the scanning module lies in the second zone; (d) determining a first moving direction of the scanning module according to the parameter; (e) controlling the scanning module to be moved in the first moving direction, thereby performing a first scanning operation; (f) judging whether the scanning module is moved across the position-calibrating structure during the first scanning operation is performed; and (g) if the scanning module is moved across the position-calibrating structure, controlling the scanning module to be moved to the standby position.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
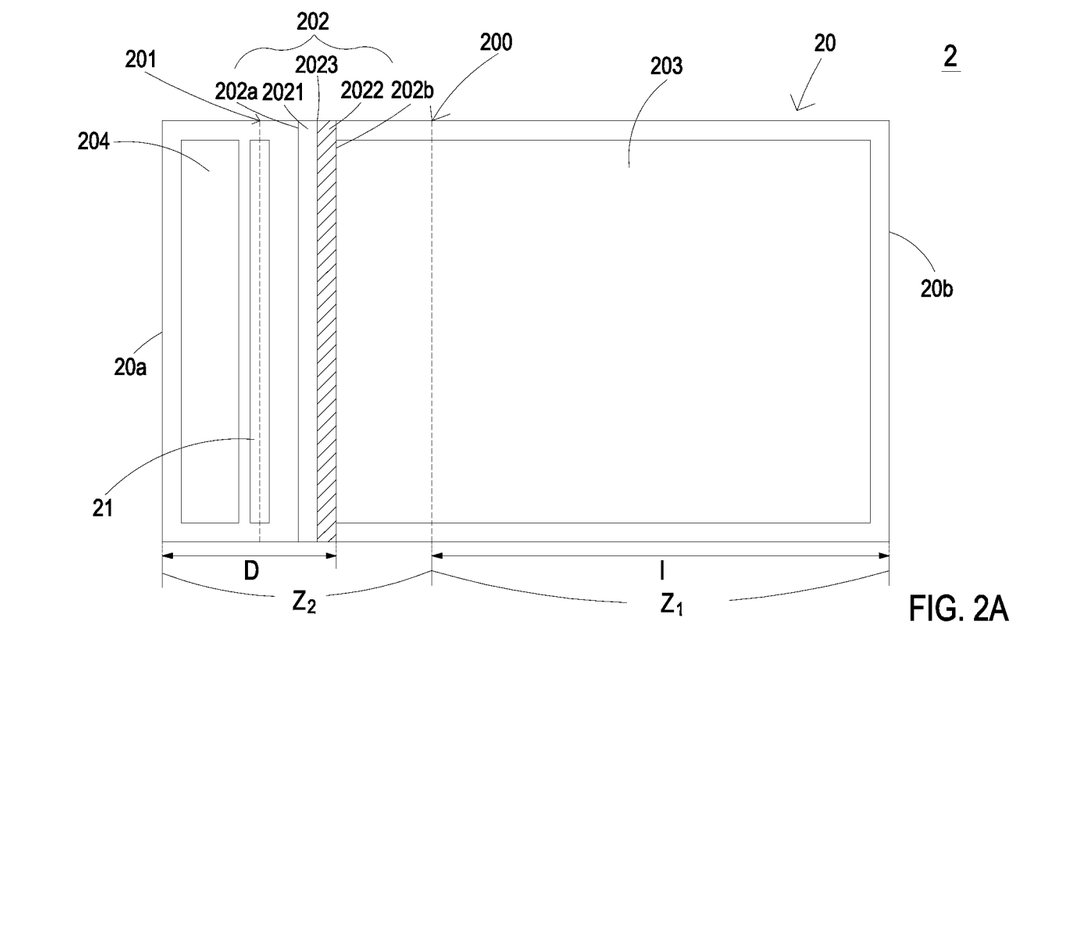
FIG. 2A is a schematic top view illustrating a multifunction peripheral according to an embodiment of the present invention.
Figure 2B:
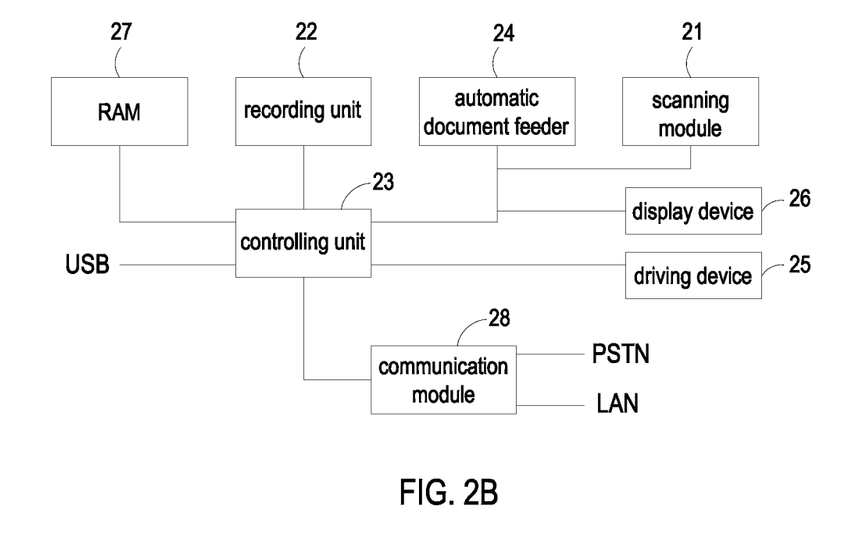
FIG. 2B is a schematic functional block diagram illustrating the components of the multifunction peripheral according to an embodiment of the present invention.

FIG. 2A is a schematic top view illustrating a multifunction peripheral according to an embodiment of the present invention. FIG. 2B is a schematic functional block diagram illustrating the components of the multifunction peripheral according to an embodiment of the present invention. Please refer to FIGS. 2A and 2B. The multifunction peripheral 2 comprises a scanning platform 20, a scanning module 21, a recording unit 22 and a controlling unit 23. The scanning platform 20 comprises a standby position 201, a position-calibrating structure 202 and a datum line 200. By the datum line 200, the scanning platform 20 is divided into a first zone Z1 and a second zone Z2. The position-calibrating structure 202 is included in the second zone Z2. The scanning module 21 is movable with respect to the scanning platform 20 for performing a scanning operation. The parameter X associated with the position of the scanning module 21 with respect to the scanning platform 20 may be recorded in the recording unit 22. The controlling unit 23 is electrically connected with the scanning module 21 and the recording unit 22. In addition, the movement of the scanning module 21 is controlled by the controlling unit 23 according to the parameter X recorded in the recording unit 22. In such way, the scanning module 21 is moved through the position-calibrating structure 202 of the scanning platform 20 to perform a position-calibrating operation. After the position-calibrating operation is completed, the scanning module 21 is moved to the standby position 201. Afterwards, in response to a scanning instruction issued by the user, the scanning module 21 performs a scanning operation on the document.

Please refer to FIG. 2A again. The scanning platform 20 of the multifunction peripheral 2 is rectangular. The scanning platform 20 has a first edge 20a and a second edge 20b, which are opposed to each other. The position-calibrating structure 202 is arranged between the first edge 20a and the second edge 20b. In addition, the first edge 20a is closer to the position-calibrating structure 202 than the second edge 20b. The position-calibrating structure 202 is an elongated rectangular plate with a first rim 202a and a second rim 202b. The first rim 202a and the second rim 202b are opposed to each other. The first rim 202a is substantially parallel with the first edge 20a of the scanning platform 20. The second rim 202b is substantially parallel with the second edge 20b of the scanning platform 20. The position-calibrating structure 202 is substantially parallel with the first edge 20a and the second edge 20b of the scanning platform 20. The first rim 202a is closer to the first edge 20a of the scanning platform 20 than the second rim 202b. In addition, the second rim 202b of the position-calibrating structure 202 is separated from the first edge 20a of the scanning platform 20 by a distance D.

In this embodiment, the position-calibrating structure 202 further comprises a pair of color plates 2021, 2022 with strong color contrast. For example, the position-calibrating structure 202 comprises a first color plate 2021 and a second color plate 2022. The first color plate 2021 and the second color plate 2022 are substantially rectangular. In addition, there is a junction 2023 between the first color plate 2021 and the second color plate 2022. It is preferred that the junction 2023 is parallel with the first rim 202a and the second rim 202b. In an embodiment, the first color plate 2021 is a white plate, and the second color plate 2022 is a black plate. The position-calibrating structure 202 is attached or printed on the scanning platform 20.

Please refer to FIG. 2A again. The standby position 201 of the scanning platform 20 is near the position-calibrating structure 202. The standby position 201 is substantially a virtual line of the scanning platform 20. After the scanning module 21 is moved through the position-calibrating structure 202 of the scanning platform 20 to perform a position-calibrating operation, the scanning module 21 is moved to the standby position 201 with respect to the position-calibrating structure 202. Preferably, the standby position 201 is arranged between the first rim 202a of the position-calibrating structure 202 and the first edge 20a of the scanning platform 20. It is noted that the location of the standby position 201 is not restricted.

The scanning platform 20 further comprises a scanning window 203. In this embodiment, the scanning window 203 is a transparent plate (e.g. a glass plate) for supporting the document (not shown) to be scanned. The scanning window 203 is ranged between the second edge 20b of the scanning platform 20 and the second rim 202b of the position-calibrating structure 202. It is preferred that the scanning window 203 abuts against the second rim 202b of the position-calibrating structure 202. In other words, the second rim 202b of the position-calibrating structure 202 may be considered as a starting position of a scanning range. After the document is placed on the scanning window 203, the scanning module 21 is moved under the scanning window 203 to perform a scanning operation to acquire a scanned image of the document.

Please refer to FIG. 2A again. The datum line 200 of the scanning platform 20 is also a virtual line. In this embodiment, the datum line 200 is arranged between the second rim 202b of the position-calibrating structure 202 and the second edge 20b of the scanning platform 20. That is, the datum line 200 is included in the scanning window 203. Preferably, the datum line 200 is near the position-calibrating structure 202. The datum line 200 is substantially parallel with the first edge 20a and the second edge 20b of the scanning platform 20. By the datum line 200, the scanning platform 20 is divided into the first zone Z1 and the second zone Z2. In other words, the second zone Z2, where the position-calibrating structure 202 is included, is collectively defined by the first edge 20a of the scanning platform 20 and the datum line 200. Whereas, the first zone Z1 is collectively defined by the second edge 20b of the scanning platform 20 and the datum line 200. The spacing interval I between the datum line 200 and the second edge 20b of the scanning platform 20 is equal to the length of the first zone Z1. The spacing interval "I" is greater than the distance "D" between the first edge 20a of the scanning platform 20 and the second rim 202b of the position-calibrating structure 202. Optionally, the multifunction peripheral 2 is equipped with an automatic document feeder 24 (see FIG. 2B). In this situation, the scanning platform 20 further comprises another scanning window 204 for the automatic document feeder 24. The scanning window 204 is arranged between the first edge 20a of the scanning platform 20 and the standby position 201. Via the scanning window 204, the document (not shown) fed into the automatic document feeder 24 may be scanned by the scanning module 21.

Please refer to FIGS. 2A and 2B again. The scanning module 21 of the multifunction peripheral 2 is disposed under the scanning platform 20. The scanning module 21 is electrically connected with the controlling unit 23 and a driving device 25. Under control of the controlling unit 23, the scanning module 21 is driven to move between the first edge 20a and the second edge 20b along a track (not shown) and with respect to the scanning platform 20. An example of the driving device 25 includes but is not limited to a motor. The scanning module 21 comprises an image reader and a light-emitting element (not shown). An example of the image reader includes but is not limited to a contact image sensor (CIS). In a case that the scanning module 21 is driven by the driving device 25 and under control of the controlling unit 23, an abrupt change of a sensing voltage is detected when the scanning module 21 is moved across the junction 2023 between the first color plate 2021 and the second color plate 2022. According to the abrupt change of said sensing voltage, the position of the scanning module 21 with respect to the scanning platform 20 will be realized by the controlling unit 23. After the position of the scanning module 21 is realized, the scanning module 21 can be calibrated.

Please refer to FIG. 2B again. For facilitating the user to understand the operating condition of the multifunction peripheral 2, the multifunction peripheral 2 further comprises a display device 26 for displaying information about the multifunction peripheral 2. In addition to the recording unit 22, the multifunction peripheral 2 further comprises a random-access memory (RAM) 27 for storing the calculating result and the program instructions. Examples of the recording unit 22 and the random-access memories 27 include but are not limited to flash memories or double data rate (DDR) synchronous dynamic random access memories. For providing a communicating function, the multifunction peripheral 2 further comprises a communication module 28 to be connected with a public switched telephone network (PSTN) and a local area network (LAN). Alternatively, the multifunction peripheral 2 may be equipped with a universal serial bus (USB). The components of the multifunction peripheral 2 are not restricted to those shown in FIG. 2B. Nevertheless, the number of components of the multifunction peripheral 2 may be increased or decreased according to the practical requirements.

Figure 3A:
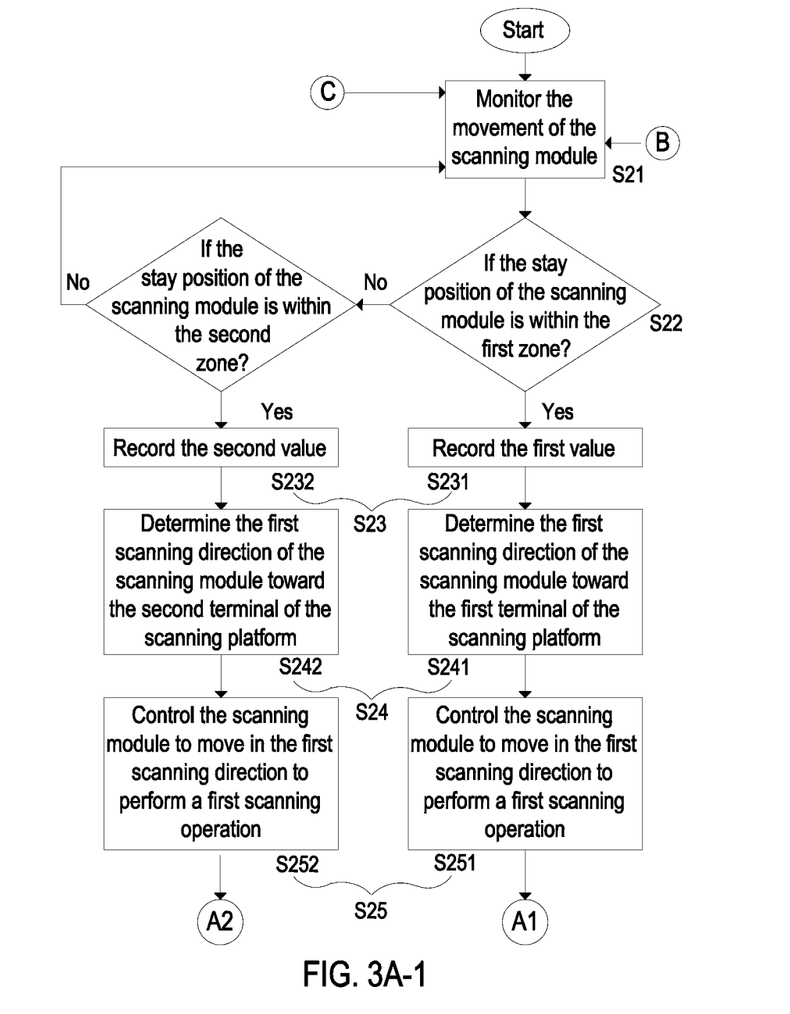
FIG. 3A is a flowchart illustrating a method for performing a position-calibrating operation of the scanning module of the multifunction peripheral according to an embodiment of the present invention.
FIG. 3B is a schematic view illustrating some paths of moving the scanning module according to the present invention.
Figure 3A:
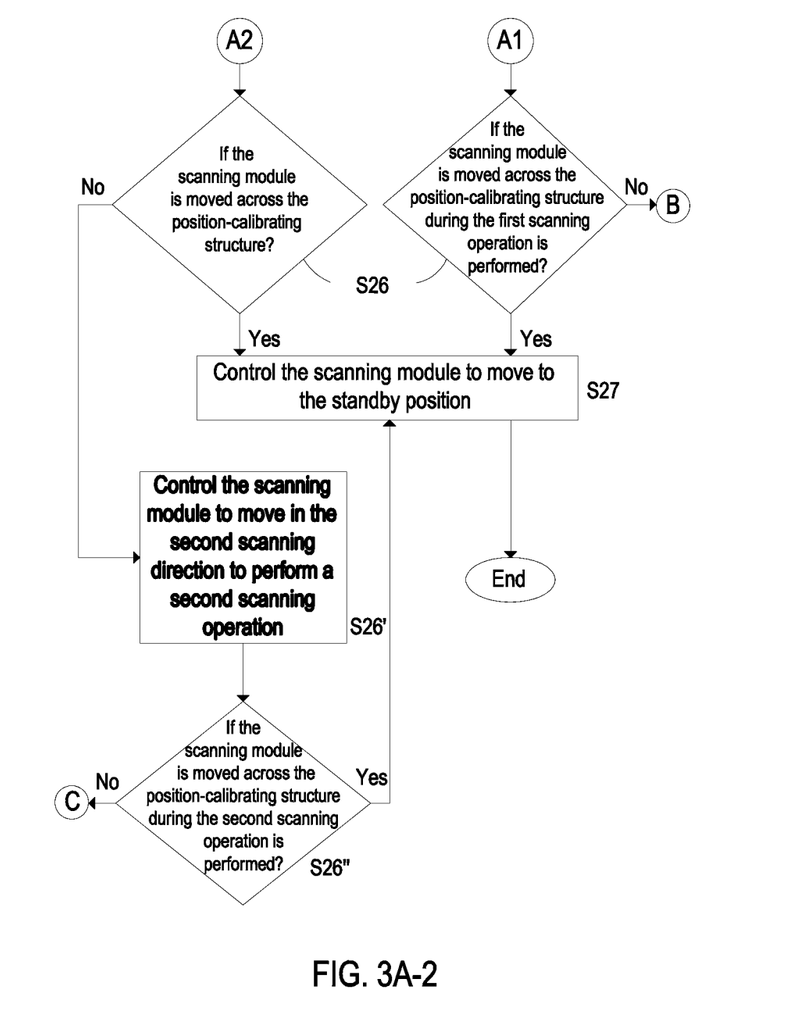

FIG. 3A is a flowchart illustrating a method for performing a position-calibrating operation of the scanning module of the multifunction peripheral according to an embodiment of the present invention. First of all, the movement of the scanning module 21 is monitored by the controlling unit 23 (Step S21). Then, the position of the scanning module 21 is detected by the controlling unit 23 (Step S22). Then, the parameter X associated with the position of the scanning module 21 with respect to the scanning platform 20 is recorded in the recording unit 22 (Step S23). The parameter X indicates the position of the scanning module 21. The parameter X is either a first value X1 or a second value X2 (e.g. 1 or 0) to respectively indicate the first zone Z1 or the second zone Z2 of the scanning platform 20. When the scanning module 21 is moved toward the second end 20b of the scanning platform 20 and introduced into the first zone Z1 through the datum line 200, the controlling unit 23 will record the first value X1 into the recording unit 22 (Step S231). Whereas, when the scanning module 21 is moved toward the first end 20a of the scanning platform 20 and introduced into the second zone Z2 through the datum line 200, the controlling unit 23 will replace the first value X1 with the second value X2 and record the second value X2 into the recording unit 22 (Step S232). Then, according to the parameter X recorded in the recording unit 22, the controlling unit 23 will determine a first moving direction of the scanning module 21 (Step S24), and then under control of the controlling unit 23, the scanning module 21 is driven by the driving device 25 to be moved in the first moving direction to perform a first scanning operation (Step S25). When the parameter X recorded in the recording unit 22 is the first value X1, the first moving direction from the current position to the first end 20a of the scanning platform 20 is determined by the controlling unit 23 (Step S241), and then the controlling unit 23 controls the driving device 25 to move the scanning module 21 in the first moving direction toward the first end 20a to perform a first scanning operation (Step S251). Whereas, when the parameter X recorded in the recording unit 22 is the second value X2, the first moving direction from the current position to the second end 20b of the scanning platform 20 is determined by the controlling unit 23 (Step S242), and then the controlling unit 23 controls the driving device 25 to move the scanning module 21 in the first moving direction toward the second end 20b to perform the first scanning operation (Step S252). Especially, in the step S252, the scanning module 21 is moved in the first moving direction for a specified displacement R. Then, according to the result of the scanning detection, the controlling unit 23 will judge whether the scanning module 21 is moved across the position-calibrating structure 202 during the first scanning operation is performed (Step 26). If the judging condition of the step S26 is satisfied, the position-calibrating operation of the scanning module 21 is completed. Meanwhile, the controlling unit 23 will control the driving device 25 to move the scanning module 21 to the standby position 201 (Step S27). Whereas, if the judging condition of the step S26 is not satisfied, the steps S21 through S26 are repeatedly done. Alternatively, if the judging condition of the step S26 is not satisfied, the scanning module 21 is controlled to move in a second moving direction that is opposed to the first moving direction, thereby performing a second scanning operation (Step S26'), and then the controlling unit 23 will judge whether the scanning module 21 is moved across the position-calibrating structure 202 during the second scanning operation is performed (Step 27'). Then, the step S26" is performed to judge whether the scanning module 21 is moved across the position-calibrating structure 202 during the second scanning operation is performed. If the judging condition of the step S26" is satisfied, the position-calibrating operation of the scanning module 21 is completed. Meanwhile, the controlling unit 23 will control the driving device 25 to move the scanning module 21 to the standby position 201 (Step S27). Whereas, if the judging condition of the step S26" is not satisfied, the steps S21 through S26 are repeatedly done.

Figure 3B:
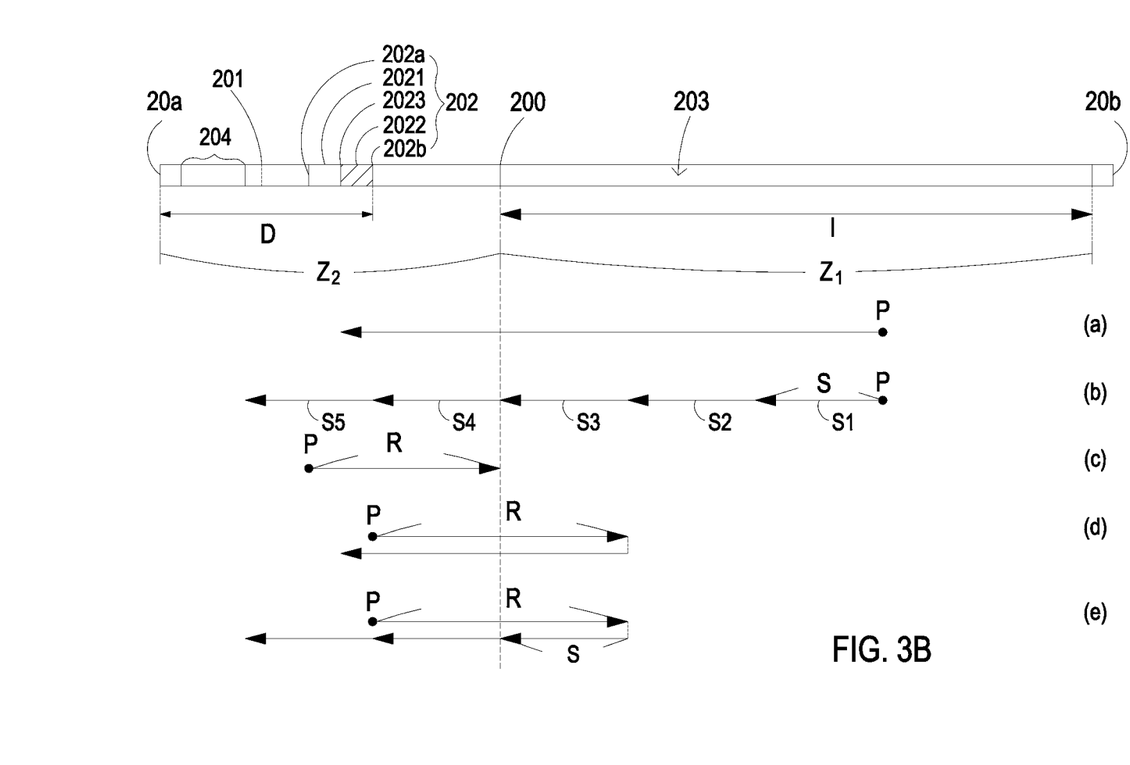

FIG. 3B is a schematic view illustrating some paths of moving the scanning module according to the present invention. Hereinafter, the method for performing the position-calibrating operation of the scanning module will be illustrated with reference to FIGS. 3A and 3B. Normally, after the scanning operation of the scanning module 21 is performed, the scanning module 21 will be returned to the standby position 201. However, if the electricity provided to the multi-function peripheral 2 is interrupted (e.g. the utility power is interrupted or the power switch is erroneously turned off), the controlling unit 23 fails to control the driving device 25 to move the scanning module 21 to the standby position 201. Under this circumstance, the scanning module 21 may be stayed at different positions of the scanning platform 20. For example, as shown in FIG. 3B, the paths (a) and (b) indicate that the stay position P of the scanning module 21 is within the first zone Z1 of the scanning platform 20; the path (c) indicates that the stay position P of the scanning module 21 is within the second zone Z2 of the scanning platform 20 and between the junction 2023 of the position-calibrating structure 202 and the first edge 20a of the scanning platform 20; and the paths (d) and (e) indicate the stay position P of the scanning module 21 is within the second zone Z2 of the scanning platform 20 and between the junction 2023 of the position-calibrating structure 202 and the datum line 200.

As shown in the path (a) of FIG. 3B, when the scanning module 21 is moved to the position P of the first zone Z1, the controlling unit 23 will record the first value X1 into the recording unit 22 (Step S231). If the multifunction peripheral 2 is powered off at this moment, the scanning module 21 is stayed at the position P of the first zone Z1. Meanwhile, the parameter X recorded in the recording unit 22 is the first value X1. Consequently, after the multifunction peripheral 2 is powered on again, the first moving direction from the current position to the first end 20a of the scanning platform 20 is determined by the controlling unit 23 (Step S241), and the controlling unit 23 controls the driving device 25 to continuously move the scanning module 21 in the first moving direction toward the first end 20a to perform a first scanning operation (Step S251). Once the scanning module 21 is moved across the junction 2023 of the position-calibrating structure 202, an abrupt change of a sensing voltage is detected. According to the abrupt change of the sensing voltage, the controlling unit 23 may judge that the scanning module 21 is moved across the position-calibrating structure 202 during the first scanning operation is performed (Step S26). Meanwhile, the driving device 25 is controlled to stop moving the scanning module 21, and thus the first scanning operation is stopped. Since the scanning module 21 is no longer continuously moved, the scanning module 11 will not hit the first edge 20a of the scanning platform 20. Moreover, since the position-calibrating operation of the scanning module 21 is performed after the scanning module 21 is moved across the position-calibrating structure 202, the controlling unit 23 will control the driving device 25 to move the scanning module 21 to the standby position 201 (Step S27).

Moreover, in the step S251, the first scanning operation may be performed in a multi-stage manner. As shown in the path (b) of FIG. 3B, the scanning module 21 is successively moved across plural segments S in a multi-stage manner. The length of each segment S is shorter than the distance D between the first edge 20a of the scanning platform 20 and the second rim 202b of the position-calibrating structure 202. Once the controlling unit 23 judges that the scanning module 21 is moved across the position-calibrating structure 202 corresponding to a specified segment S, the first scanning operation is stopped immediately after the specified segment S has been scanned. For example, as shown in the path (b) of FIG. 3B, the controlling unit 23 judges that the scanning module 21 is moved across the position-calibrating structure 202 corresponding to the fifth segment S5. Consequently, the first scanning operation is stopped immediately after the fifth segment S5 has been scanned. Since the length of each segment S is shorter than the distance D, the scanning module 11 will not hit the first edge 10a of the scanning platform 20.

As shown in the path (c) of FIG. 3B, the stay position P of the scanning module 21 is within the second zone Z2 of the scanning platform 20 and between the junction 2023 of the position-calibrating structure 202 and the first edge 20a of the scanning platform 20. When the scanning module 21 is moved to the position P of second first zone Z2, the controlling unit 23 will record the second value X2 into the recording unit 22 (Step S232). If the multifunction peripheral 2 is powered off at this moment, the scanning module 21 is stayed at the position P of the second zone Z2. Meanwhile, the parameter X recorded in the recording unit 22 is the second value X2. Consequently, after the multifunction peripheral 2 is powered on again, the first moving direction from the current position to the second end 20b of the scanning platform 20 is determined by the controlling unit 23 (Step S242), and the controlling unit 23 controls the driving device 25 to move the scanning module 21 in the first moving direction toward the second end 20b to perform a first scanning operation (Step S252). In the step S252, the scanning module 21 is moved in the first moving direction for a specified displacement R. The specified displacement R is substantially equal to the distance D between the first edge 20a of the scanning platform 20 and the second rim 202b of the position-calibrating structure 202. Since the stay position P of the scanning module 21 is between the junction 2023 of the position-calibrating structure 202 and the first edge 20a of the scanning platform 20, the controlling unit 23 may judge that the scanning module 21 is moved across the position-calibrating structure 202 during the first scanning operation is performed (Step S26). Then, the controlling unit 23 will control the driving device 25 to move the scanning module 21 to the standby position 201 (Step S27).

As shown in the paths (d) and (e) of FIG. 3B, the stay position P of the scanning module 21 is within the second zone Z2 of the scanning platform 20 and between the junction 2023 of the position-calibrating structure 202 and the datum line 200. The steps S232, S242 and S252 are successively performed. In the Step S26, the controlling unit 23 may judge that the scanning module 21 is not moved across the position-calibrating structure 202 during the first scanning operation is performed. After the first scanning operation is completed, the controlling unit 23 controls the driving device 25 to move the scanning module 21 in the second moving direction toward the second end 20b to perform a second scanning operation. Like the path (a) of FIG. 3B, the path (d) shows that the second scanning operation is continuously performed. Like the path (b) of FIG. 3B, the path (e) shows that the second scanning operation is performed in a multi-stage manner.

Please refer to the paths (d) and (e) of FIG. 3B again. During the first scanning operation is performed, the scanning module 21 is moved in the first moving direction for a specified displacement R. The specified displacement R is substantially equal to the distance D, but shorter than the spacing interval I between the datum line 200 and the second edge 20b of the scanning platform 20. Consequently, the scanning module 11 will not hit the first edge 20a of the scanning platform 20. Like the paths (a) and (b) of FIG. 3B, during the second scanning operation is performed, the scanning module 11 will not hit the first edge 20a of the scanning platform 20.

From the above description, in a case that the stay position of the scanning module 21 is within the first zone Z1, the controlling unit 23 controls movement of the scanning module 21 in the first moving direction toward the position-calibrating structure 202 to perform a first scanning operation. In addition, once the controlling unit 23 detects that the scanning module 21 is moved across the position-calibrating structure 202, the movement of the scanning module 21 is stopped. Alternatively, once the controlling unit 23 judges that the scanning module 21 is moved across the position-calibrating structure 202 corresponding to a specified segment S, the first scanning operation is stopped immediately after the specified segment S has been scanned. On the other hand, in a case that the stay position of the scanning module 21 is within the second zone Z2, the controlling unit 23 controls movement of the scanning module 21 in the first moving direction toward the second edge 20b of the scanning platform 20 to perform a first scanning operation. If the scanning module 21 has not been moved across the position-calibrating structure 202 during the first scanning operation is performed, the scanning module 21 is controlled to move in a second moving direction that is opposed to the first moving direction, thereby performing a second scanning operation. Once the controlling unit 23 detects that the scanning module 21 is moved across the position-calibrating structure 202, the movement of the scanning module 21 is stopped. Alternatively, once the controlling unit 23 judges that the scanning module 21 is moved across the position-calibrating structure 202 corresponding to a specified segment S, the first scanning operation is stopped immediately after the specified segment S has been scanned.

It is noted that the scanning module is controlled to move in a first scanning direction according to the stay position of the scanning module during the first scanning operation is performed. In comparison with the prior art, the position-calibrating method of the present invention is more time-saving to implement the position-calibrating operation. As a consequence, the processing efficiency of the multifunction peripheral of the present invention is enhanced. Moreover, since the position-calibrating method of the present invention can prevent the scanning module from hitting the first edge or the second edge of the platform, the noise resulting from hitting the first edge or the second edge will be eliminated and the possibility of abrading the gear set will be minimized.

In the above embodiments, the standby position is arranged between the position-calibrating structure and the first edge of the scanning platform, and the scanning window abuts against the position-calibrating structure. In such way, during the scanning module is moved from the standby position to the scanning window, the moving speed of the scanning module is stabilized and thus the scanning performance is enhanced. In some embodiments, the second rim of the position-calibrating structure may be defined as the standby position. In some embodiments, if the first scanning operation or the second scanning operation of the scanning module is performed in a multi-stage manner, after the position-calibrating structure is detected, the scanning module may be selectively moved toward to second edge of the scanning platform to perform a third scanning operation. In the above embodiments, the datum line is included in the scanning window and arranged beside the position-calibrating structure. Nevertheless, the location of the datum line is not restricted. For example, in a case that the position-calibrating structure is included in the second zone, the location of the datum line is selected such that the length of the first zone is substantially greater than the distance between the first edge of the scanning platform and the second rim of the position-calibrating structure.

From the above description, in the position-calibrating method of the present invention, the scanning platform is divided into a first zone and a second zone by the datum line, a parameter associated with a position of the scanning module is recorded, and the first scanning direction of the scanning module is determined according to the parameter. In such way, the unnecessary movement of the scanning module is avoided, and thus it is time-saving to perform the position-calibrating operation of the scanning module. Moreover, since the first scanning operation and the second scanning operation may be performed in a multi-stage manner or the movement of the scanning module is stopped when the position-calibrating structure is detected, the noise resulting from hitting the first edge or the second edge will be eliminated and the possibility of abrading the gear set will be minimized. Therefore, the use life of the multifunction peripheral will be prolonged.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multifunction peripheral, comprising:
   a scanning platform comprising a standby position, a position-calibrating structure and a datum line, wherein said scanning platform is divided into a first zone and a second zone by said datum line, and said position-calibrating structure is included in said second zone;
   a scanning module movable with respect to said scanning platform for performing a scanning operation;

a recording unit for recording a parameter associated with a position of said scanning module with respect to said scanning platform, wherein said parameter is either a first value to indicate that said position of said scanning module lies in said first zone or a second value to indicate that said position of said scanning module lies in said second zone; and a controlling unit for controlling moving direction of said scanning module according to said parameter recorded in said recording unit, so that said scanning module is moved through said position-calibrating structure to perform a position-calibrating operation, wherein after said position-calibrating operation is completed, said scanning module is moved to said standby position.

2. The multifunction peripheral according to claim 1 wherein said scanning platform has a first edge and a second edge, which are opposed to each other to respectively define said first zone and said second zone with said datum line, wherein said position-calibrating structure has a first rim and a second rim substantially parallel with said first edge and said second edge of said scanning platform, respectively, wherein said second rim of said position-calibrating structure is separated from said first edge of said scanning platform by a specified distance.

3. The multifunction peripheral according to claim 2 wherein said scanning platform further comprises a scanning window, which is ranged between said second edge of said scanning platform and said second rim of said position-calibrating structure, wherein said datum line is included in said scanning window and parallel with said first edge and said second edge of said scanning platform, and a spacing interval between said datum line and said second edge of said scanning platform is greater than said specified distance.

4. The multifunction peripheral according to claim 1 wherein said standby position of said scanning platform is near said position-calibrating structure.

5. The multifunction peripheral according to claim 1 wherein said position-calibrating structure of said scanning platform comprises a first color plate and a second color plate, and there is a junction between said first color plate and said second color plate, wherein an abrupt change of a sensing voltage is detected when said scanning module is moved across said junction, and said position of said scanning module with respect to said scanning platform is realized by said controlling module according to said abrupt change of said sensing voltage.

6. A position-calibrating method of a scanning module of a multifunction peripheral according to claim 1, wherein said position-calibrating method comprising steps of:
 (a) monitoring movement of said scanning module;
 (b) detecting a position of said scanning module;
 (c) recording said parameter associated with said position of said scanning module, wherein said parameter is either a first value to indicate that said position of said scanning module lies in said first zone or a second value to indicate that said position of said scanning module lies in said second zone;
 (d) determining a first moving direction of said scanning module according to said parameter;
 (e) controlling said scanning module to be moved in said first moving direction, thereby performing a first scanning operation;
 (f) judging whether said scanning module is moved across said position-calibrating structure during said first scanning operation is performed; and
 (g) if said scanning module is moved across said position-calibrating structure, controlling said scanning module to be moved to said standby position.

7. The position-calibrating method according to claim 6 wherein said scanning platform has a first edge and a second edge, which are opposed to each other, wherein said position-calibrating structure is near said first edge of said scanning platform and includes a first rim and a second rim, wherein said first rim is closer to said first edge of said scanning platform than said second rim, and said second rim of said position-calibrating structure is separated from said first edge of said scanning platform by a specified distance.

8. The position-calibrating method according to claim 7 wherein if said parameter is said first value in said step (c), said first moving direction of said scanning module is toward said first edge of said scanning platform in said step (d).

9. The position-calibrating method according to claim 8 wherein in said step (e), said scanning module is continuously moved in said first moving direction to perform said first scanning operation, wherein once said step (f) judges that said scanning module is moved across said position-calibrating structure, said first scanning operation of said scanning module is stopped.

10. The position-calibrating method according to claim 8 wherein in said step (e), said scanning module is successively moved across plural segments in a multi-stage manner, wherein a length of said segment is shorter than said distance between said first edge of said scanning platform and said second rim of said position-calibrating structure, wherein once said step (f) judges that said scanning module is moved across said position-calibrating structure corresponding to a specified segment, said first scanning operation is stopped immediately after said specified segment has been scanned.

11. The position-calibrating method according to claim 7 wherein if said parameter is said second value in said step (c), said first moving direction of said scanning module is toward said second edge of said scanning platform in said step (d), wherein in said step (e), said scanning module is moved for a specified displacement during said first scanning operation is performed, and said specified displacement is equal to said distance between said first edge of said scanning platform and said second rim of said position-calibrating structure.

12. The position-calibrating method according to claim 11 wherein if said scanning module has not been moved across said position-calibrating structure, said position-calibrating method further comprises steps of:
 (f1) controlling said scanning module to be moved in a second moving direction, thereby performing a second scanning operation; and
 (f2) judging whether said scanning module is moved across said position-calibrating structure during said second scanning operation is performed.

13. The position-calibrating method according to claim 12 wherein in said step (f1), said scanning module is continuously moved in said second moving direction to perform said second scanning operation, wherein once said step (f2) judges that said scanning module is moved across said position-calibrating structure, said second scanning operation of said scanning module is stopped.

14. The position-calibrating method according to claim 12 wherein in said step (f1), said scanning module is successively moved across plural segments in a multi-stage manner, wherein a length of said segment is shorter than said distance between said first edge of said scanning platform and said second rim of said position-calibrating structure, wherein once said step (f2) judges that said scanning module is moved across said position-calibrating structure corresponding to a specified segment, said second scanning operation is stopped immediately after said specified segment has been scanned.

* * * * *